United States Patent [19]
Jennings, Jr.

[11] Patent Number: 5,316,082
[45] Date of Patent: May 31, 1994

[54] METHOD OF EFFECTIVELY DIVERTING TREATING FLUID FROM A HIGH PERMEABILITY INTERVAL DURING WELL STIMULATION

[75] Inventor: Alfred R. Jennings, Jr., Plano, Tex.

[73] Assignee: Mobil Oil Corporation, Fairfax, Va.

[21] Appl. No.: 936,480

[22] Filed: Aug. 28, 1992

[51] Int. Cl.$^5$ ............... E21B 33/138; E21B 43/26; E21B 43/27

[52] U.S. Cl. .................. 166/281; 166/294; 166/385

[58] Field of Search ............ 166/294, 292, 269, 270, 166/271, 281, 307, 308, 385

[56] References Cited

U.S. PATENT DOCUMENTS

| | | | |
|---|---|---|---|
| 4,265,311 | 5/1981 | Ely | 166/271 |
| 4,750,562 | 6/1988 | Jennings, Jr. | 166/294 X |
| 4,819,727 | 4/1989 | Jennings, Jr. | 166/292 |
| 4,834,181 | 5/1989 | Uhri et al. | 166/281 |
| 4,842,068 | 6/1989 | Vercaemer et al. | 166/294 X |
| 4,848,464 | 7/1989 | Jennings, Jr. | 166/270 |
| 4,883,124 | 11/1989 | Jennings, Jr. | 166/307 |
| 4,887,670 | 12/1989 | Lord et al. | 166/281 |
| 4,889,818 | 2/1990 | Jennings, Jr. et al. | 166/281 X |
| 5,150,754 | 9/1992 | Phelps | 166/294 |

Primary Examiner—Stephen J. Novosad
Attorney, Agent, or Firm—Alexander J. McKillop; George W. Hager, Jr.; Charles A. Malone

[57] ABSTRACT

A process to temporarily seal an upper zone of higher permeability. Coiled tubing is used to cover a zone of lower permeability with a gel block containing rock salt. A lower density, more stable, slower yielding gel block having a gel breaker is squeezed into the upper zone. The well is shut-in and the low density gel plug becomes rigid. Water is then circulated down the coiled tubing to dissolve the high density gel block out of the wellbore and re-open lower perforations which allows the low permeability interval to be treated.

13 Claims, 1 Drawing Sheet

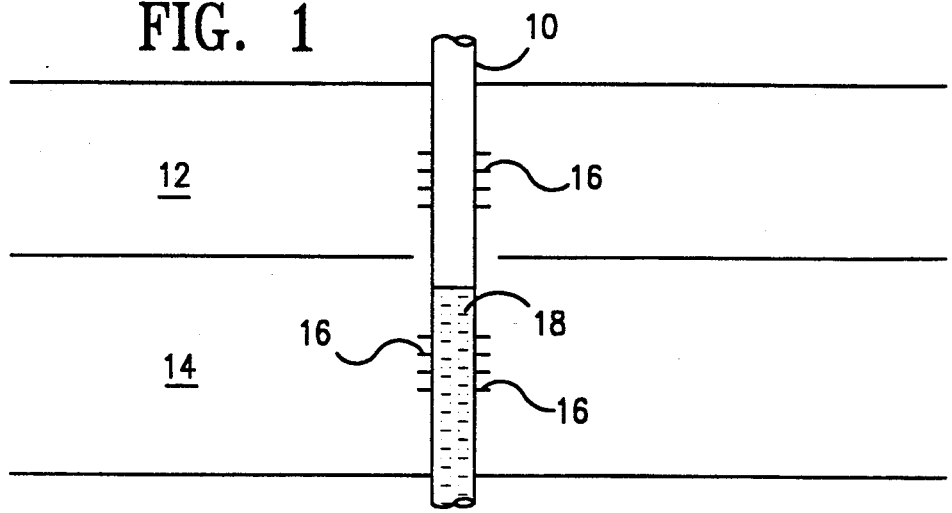
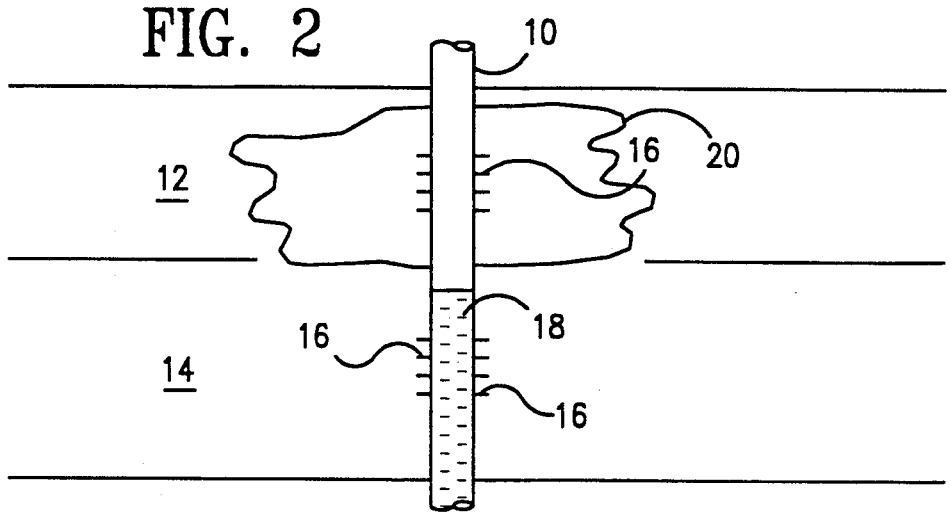
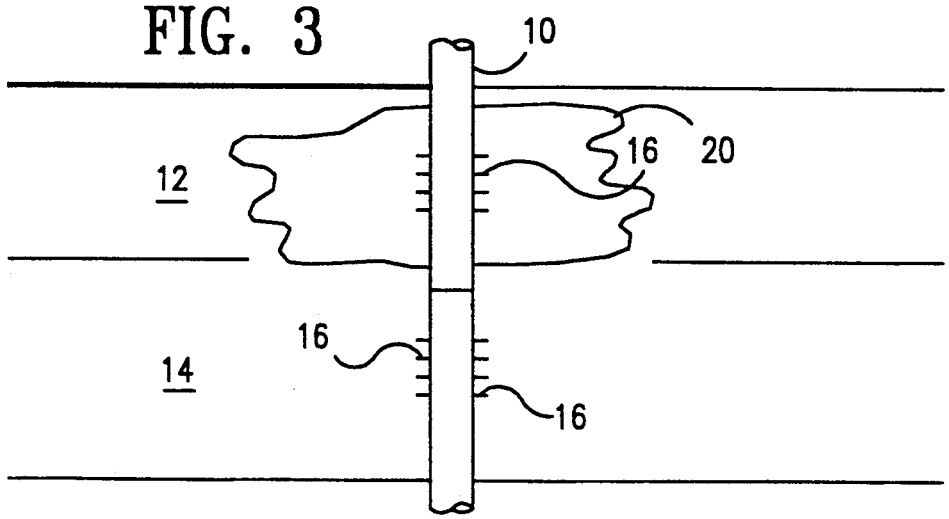

METHOD OF EFFECTIVELY DIVERTING TREATING FLUID FROM A HIGH PERMEABILITY INTERVAL DURING WELL STIMULATION

FIELD OF THE INVENTION

This invention relates to a method for diverting a treating fluid from a high permeability zone in a formation which is located below a lower permeability zone.

BACKGROUND OF THE INVENTION

In oil production, primary operations are frequently ineffective in recovering a substantial proportion of oil-in-place, often leaving as much as 60-80% of the oil as residual. It is common, therefore, to employ so called secondary or tertiary methods to obtain additional oil. One such secondary or tertiary method involves flooding the producing formation with an oil displacement fluid, such as water, steam, gases, etc. through one or more injection wells spaced from the producing wells. As the leading edge, or front, of the flood fluid progresses through the formation, oil in the formation is pushed towards the producing well. Where plural injection wells are used, fluids from neighboring wells may emerge to form a combined front, and such combined front may indeed completely surround a producing well.

In general, the geological and fluid properties (saturations, permeabilities, etc.) of hydrocarbonaceous zones cause uneven forward movement of native or injected fluids. In addition, the extent of an even fluid movement increases with hydrocarbon recovery, field operations and type of well pattern used in enhanced recovery operations.

Often a format ion or reservoir may contain zones of varying degrees of permeability. During a water flood or other recovery method, hydrocarbonaceous fluids may be removed from a higher permeability zone while a lower permeability zone retains hydrocarbonaceous fluids. These retained fluids often cannot be removed without blocking off the zone of higher permeability and diverting the injected fluid to the zone of lower permeability.

Also, wells are frequently completed where there are zones of varying permeabilities. In most cases, the higher permeability zones have a greater tendency to accept acids and fracturing fluid thus minimizing the effectiveness of treatment and stimulation of lower permeability intervals. Sometimes, the higher permeability zones can be isolated mechanically. However, wellbore equipment (tubing set through a permanent packer, e.g.) may limit the ability to mechanically isolate a zone. If the high permeability zone is in the lower part of the wellbore, rock salt, sand, high density plugs, or a combination of these materials can be used to isolate the interval. However, if the high permeability zone is in the upper part of the wellbore, diversion becomes considerably more difficult.

Therefore, what is needed is a method to temporarily isolate an upper high permeability zone while treating a lower permeability zone to increase its permeability for the increased production of hydrocarbonaceous fluids.

SUMMARY

This invention is directed to a method for diverting treating fluid from a high permeability zone during well stimulation where a lower permeability zone is located there below. Initially, a first solidifiable gel mixture of a known density containing a water soluble salt mixed therein is directed into a lower permeability zone and into a wellbore area adjacent thereto. Next, a second solidifiable mixture having a density less than the first solidifiable gel mixture is directed into the wellbore. This second solidifiable gel mixture contains gel breakers therein and is directed into a higher permeability zone and the wellbore area adjacent thereto. Here it forms subsequently a solid gel that is more stable and slower yielding than is the first solid gel. These gels are allowed to remain in both zones and in the wellbore areas adjacent thereto for a time sufficient to form solid gels in said zones and wellbore areas adjacent thereto. Because the first solidifiable gel mixture is of a density higher than the second solidifiable gel mixture, it is precluded from entering the higher permeability zone because of a density difference between the mixtures.

Subsequently, the solid gel which has formed in the lower permeability zone and wellbore area adjacent thereto is removed preferably, by flowing water therethrough. Afterwards, a treating fluid is directed into the lower permeability zone so as to increase its permeability either by fracturing or acidizing. After completing the treating of the lower permeability zone, the gel in the higher permeability zone is removed and both zones are placed back into production to remove hydrocarbonaceous fluids therefrom.

It is therefore an object of this invention to provide a method for increasing the permeability of a lower permeability zone located beneath a higher permeability zone so as to increase the production of hydrocarbonaceous fluids from the lower permeability zone.

It is another object of this invention to substantially decrease well production down time while treating a formation which has varying permeability characteristics in order to increase the recovery of hydrocarbonaceous fluids.

It is yet another object of this invention to provide for a method of isolating a higher permeability zone while stimulating a lower permeability zone in those instances where a mechanical packer cannot be used.

It is an even yet further object of this invention to provide a method for preventing a treating or stimulating fluid from entering into a higher permeability zone.

It is a still yet further object of this invention to provide for a method of isolating a higher permeability zone while treating a lower permeability zone so as to increase the amount of treating fluid entering a lower permeability zone.

It is an even still yet further object of this invention to provide for an economical and cost effective method for controlling the production of hydrocarbonaceous fluids from formations having zones of varying permeabilities.

BRIEF DESCRIPTION OF THE DRAWINGS

FIG. 1 is a schematic representation which shows a high density/soluble gel plug in place in the wellbore adjacent to a low permeability zone.

FIG. 2 shows schematically a higher permeability zone blocked off with a low density gel plug with gel breakers therein and a high density/soluble gel plug in place in the wellbore adjacent to the lower permeability zone.

FIG. 3 shows schematically that the gel plug has been removed from the wellbore adjacent to the lower permeability zone while the higher permeability zone remains blocked off with the low density gel plug.

BRIEF DESCRIPTION OF THE PREFERRED EMBODIMENTS

In the practice of this invention, referring to FIG. 1, a solidifiable gel mixture of a known density containing a water soluble salt mixed therein is directed into lower permeability zone 14 by perforations 16 contained in wellbore 10. Intrusion of this gel mixture into lower permeability zone 14 is minimized due to gelation during the placement of said mixture into wellbore 10 via a coiled tubing from the surface. Next, a second solidifiable mixture having a density less than the first solidifiable mixture is directed into higher permeability zone 12 by perforations 16 contained in wellbore 10. This solidifiable gel mixture which enters into higher permeability zone 12 contains gel breakers in an amount sufficient to break down the gel after the first gel has been removed from the wellbore and area adjacent thereto. This second solidifiable mixture forms a solid gel that is more stable and slower yielding than the first gel. The first gel 18 and second gel 20 are shown in FIG. 2. This second gel mixture is placed into the wellbore so as to remain above the first gel mixture because of a density difference between the two gel mixtures.

The well is shut-in and both gels remain in their respective zones and in the wellbore adjacent to said zone for a time sufficient to form a solid gel in their respective zones and also within the wellbore. In one embodiment, the second solidifiable mixture is directed around the coiled tubing which is connected to a pumping means on the surface. Therefore, when the gel forms a solid, the coiled tubing will communicate with the gel formed in lower permeability zone 14 as it penetrates the solid gel from thereabove in the wellbore area adjacent to higher permeability zone 12.

Once both zones have been closed by a solid gel to preclude fluid flow into said zones, water is directed into the coiled tubing (not shown) so as to contact the solid gel formed in wellbore lo adjacent to lower permeability zone 14. Water is flowed in and out of the wellbore via perforations 16 which communicate with lower permeability zone 14 for a time sufficient to remove the gel due to the rock salt being dissolved therefrom. Once the gel plug of lower permeability zone 14 has been removed, the gel formed in higher permeability zone 12 and wellbore area communicating therewith remains intact. This is shown in FIG. 3. Because the solid gel remains intact in the high permeability zone communicating with the wellbore, it serves as a plug so as to help pressurize any treating fluid or fracturing fluid which will be directed down a coiled tubing in wellbore 10 into lower permeability zone 14.

Next, a fracturing fluid or acidizing fluid is directed through the coiled tubing (not shown) so as to enter lower permeability zone 14 via perforations 16 in wellbore 10. Lower permeability zone 14 can then be either hydraulically fractured or acidized by the use of an appropriate treating fluid. Once lower permeability zone 14 has been treated in a manner so as to increase its permeability and allow additional hydrocarbonaceous fluids to be produced therefrom, acidizing or hydraulic fracturing is ceased.

After cessation of the acidizing or hydraulic fracturing operation in lower permeability zone 14, the solid gel formed in the wellbore and area adjacent thereto in higher permeability zone 12 is allowed to liquify because of the gel breakers contained therein. An acid can also be used to remove said gel in those situations where gel breakers are not utilized. After removing the gel from higher permeability zone 14 and wellbore area adjacent thereto, both zones will then be in fluid communication with wellbore 10. Thereafter, hydrocarbonaceous fluids will be produced from higher permeability zone 12 and lower permeability zone 14.

When treating lower permeability zone 14 with the hydraulic fracturing method, a method as disclosed in U.S. Pat. No. 4,834,181, which issued to Uhri et al. on May 30, 1989, can be used to hydraulically fracture the formation. Acid solutions which can be used in acidizing the formation when treating low permeability zone 14 are disclosed in U.S. Pat. No. 4,883,124, which issued to Jennings, Jr. on Nov. 28, 1989. Both of these patents are hereby incorporated by reference herein.

Methods and compositions for making solidifiable mixtures which can be used herein are disclosed in U.S. Pat. No. 4,819,727 which issued to Jennings, Jr. on Apr. 11, 1989. This patent is incorporated by reference herein. A preferred mixture for utilization herein to obtain a desired stability and rigidity is a mixture of hydropropyl guar cross-linked with transitional metals and ions thereof. The purpose of the transitional metal ions is to provide increased strength, stability and rigidity for the gels which are formed.

Hydropropyl guar is placed into the gel mixture in the amount of from about 0.70 to about 10.0 wt. % of said mixture. As preferred, hydropropyl gum which is placed into said mixture to form a high density gel should be about 7.2 to about 10.0 wt. % of said mixture. Metallic ions which can be used herein are also discussed in U.S. Pat. No. 4,819,727 supra. The density of the second solidifiable gel mixture which enters high permeability zone 12 should contain from about 0.70 to about 7.0% wt. of said mixture so as to enable it to remain in the wellbore and the high permeability zone adjacent thereto. Chemicals which can be used as gel breakers are added to the second solidifiable gel mixture so as to allow it to form a solid gel and remain in place until lower permeability zone has the gel removed therefrom and subsequently allow treating of the lower permeability zone as desired. These gel breakers include enzymes and oxidizing agents suitable for breaking down the solid gel. Other gel breakers sufficient for this purpose, in addition to sodium persulfate are discussed in U.S. Pat. No. 4,265,311 which issued to Ely on May 5, 1981. This patent is hereby incorporated by reference herein.

In order to obtain a higher density of the second solidifiable gel mixture, rock salt can be placed into the mixture. When this mixture forms a solid gel, the rock salt will remain in place and can be subsequently removed with the gel by dissolving the rock salt. Although rock salt or sodium chloride is preferred, other salts which can be used include potassium chloride, calcium chloride, and zinc chloride. When it is desired to remove these salts from the first solidifiable gel mixture which is directed into the wellbore and lower permeability zone 14, an aqueous solution can be utilized via the coiled tubing. These aqueous solutions can comprise fresh water, salt water or mixtures thereof. A preferred aqueous solution for use in water-sensitive lower permeability zones comprises a 2 wt. % solution of potassium chloride.

The coiled tubing used to penetrate the gel plug formed in wellbore 10 adjacent to high permeability zone 12 is used to direct the aqueous solution to the gel in lower permeability zone 14 via pumping therein. By pumping the aqueous solution into the solid gel in wellbore 10 and lower permeability zone 14, the aqueous solution is allowed to remain there until the gel and rock salt is solubilized. Afterwards, the solubilized solution can be removed by placing suction on the coiled tubing and thereafter pumping it to the surface. Alternatively, two coiled tubings can be used to penetrate the gel formed in the wellbore. These two separate coiled tubings fluidly communicate with the gel formed in lower permeability zone 14 and the wellbore. By use of appropriate connecting means, one coiled tubing can be used to direct the first solidifiable mixture into the wellbore 10 and lower permeability zone 14. Another coiled tubing can be used to remove liquified gel. Once it is desired to remove the gel which subsequently formed a solid from the higher permeability zone and wellbore, the aqueous solution is flowed in through one coiled tubing and the solubilized salt and gel mixture is removed by another coiled tubing to the surface. The coiled tubing which is used herein can consist of a 1-in. tubing or other small pipe which is wound on a spool at the surface at wellbore 10.

Although the present invention has been described with preferred embodiments, it is to be understood that modifications and variations may be resorted to without departing from the spirit and scope of this invention as those skilled in the art readily understand. Such modifications and variations are considered to be within the purview and scope of the appended claims.

What is claimed:

1. A method for diverting treating fluid from a high permeability zone during well stimulation comprising:
    a) directing a first solidifiable gel mixture of a known density having a water soluble salt mixed therein into a lower permeability zone located beneath a higher permeability zone and into a wellbore area adjacent thereto;
    b) directing a second solidifiable gel mixture having a density less than the first solidifiable gel with gel breakers therein into the higher permeability zone and wellbore area adjacent thereto so as to form subsequently, a solid gel that is more stable and slower yielding than said first gel; and
    c) allowing both gels to remain in said zone and wellbore areas adjacent thereto for a time sufficient to form a solid gel in said zones and wellbore areas where said gel mixtures are precluded from entering an undesired permeability zone because of a density difference between said mixtures.

2. The method as recited in claim 1 where after step c) a coiled tubing from the surface penetrates both gels in the wellbore and terminates adjacent to the lower permeability zone where water is used to remove the gel in this zone and wellbore area adjacent thereto.

3. The method as recited in claim 1 where after step c) a coiled tubing from the surface penetrates both gels in the wellbore and terminates adjacent to the lower permeability zone where water is used to remove the gel in this zone and wellbore area adjacent thereto where thereafter a treating fluid is directed into this zone via said tubing.

4. The method as recited in claim 1 where the second gel breaks, the first gel is removed, the lower permeability zone is treated, and hydrocarbonaceous fluids are produced from both zones.

5. A method for diverting treating fluid from a high permeability zone during well stimulation comprising:
    a) directing via a coiled tubing a first solidifiable gel mixture of a known density having a water soluble salt mixed therein into a lower permeability zone located beneath a higher permeability zone and into a wellbore area adjacent thereto;
    b) directing a second solidifiable gel mixture having a density less than the first solidifiable gel with gel breakers therein into the higher permeability zone and wellbore area adjacent thereto so as to form subsequently, a solid gel that is more stable and slower yielding than said first gel;
    c) allowing both gels to remain in said zone and wellbore areas adjacent thereto for a time sufficient to form a solid gel in said zones and wellbore areas where said gel mixtures are precluded from entering an undesired permeability zone because of a density difference between said mixtures;
    d) removing the solid gel from the lower permeability zone and wellbore area adjacent thereto via an aqueous solution directed into said lower permeability zone by the coiled tubing in step a); and
    e) treating the lower permeability zone with a treating fluid which increases the production of hydrocarbonaceous fluids from said lower permeability zone.

6. The method as recited in claim 5 where the solid gel is removed from the higher permeability zone and wellbore area adjacent thereto and thereafter hydrocarbonaceous fluids are produced from both zones.

7. The method as recited in claim 5 where in step d) the aqueous solution comprises fresh water, salt water, and mixtures thereof.

8. The method as recited in claim 5 where in step a) the water soluble salt comprises rock salt.

9. The method as recited in claim 5 where in step d) the aqueous solution comprises a 2 wt % potassium chloride solution which is used to treat a water-sensitive lower permeability zone.

10. A method for diverting treating fluid from a high permeability zone during well stimulation comprising:
    a) directing via a coiled tubing a first solidifiable gel mixture of a known density having a water soluble salt mixed therein into a lower permeability zone located beneath a higher permeability zone and into a wellbore area adjacent thereto;
    b) directing a second solidifiable gel mixture having a density less than the first solidifiable gel with gel breakers therein into the higher permeability zone and wellbore area adjacent thereto so as to form subsequently, a solid gel that is more stable and slower yielding than said first gel;
    c) allowing both gels to remain in said zone and wellbore areas adjacent thereto for a time sufficient to form a solid gel in said zones and wellbore areas where said gel mixtures are precluded from entering an undesired permeability zone because of a density difference between said mixtures;
    removing the solid gel from the lower permeability zone and wellbore area adjacent thereto via an aqueous solution directed into said lower permeability zone by the coiled tubing in step a);
    e) treating the lower permeability zone with a treating fluid which increases the production of hydrocarbonaceous fluids from said lower permeability zone;

f) removing the solid gel from the higher permeability zone and wellbore area adjacent thereto; and g) producing hydrocarbonaceous fluids from both zones.

11. The method as recited in claim 10 where in step d) the aqueous solution comprises fresh water, salt water, and mixtures thereof.

12. The method as recited in claim 10 where in step a) the water soluble salt comprises rock salt.

13. The method as recited in claim 10 where in step d) the aqueous solution comprises a 2 wt % potassium chloride solution which is used to treat a water-sensitive lower permeability zone.

* * * * *